Patented June 5, 1928.

1,672,000

UNITED STATES PATENT OFFICE.

WALTER SCHOELLER, OF BERLIN-WESTEND, AND HERBERT SCHOTTE, OF BERLIN-WILMERSDORF, GERMANY, ASSIGNORS TO THE FIRM CHEMISCHE FABRIK AUF ACTIEN (VORM. E. SCHERING), OF BERLIN, GERMANY.

CAMPHORIC ALKALOIDS AND PROCESS OF MAKING SAME.

No Drawing. Application filed March 16, 1927, Serial No. 175,923, and in Germany April 15, 1926.

Our invention refers to new products having valuable therapeutical properties and to the process of making same. It more particularly concerns alkaloid compounds of camphoric acid. Camphoric acid, similar to other bicarboxylic acids, is known to form two kinds of salts, neutral and acid salts. We have now ascertained that, contrary to what could be expected, alkaloids which are capable of paralyzing the nervus vagus as for instance hyoscyamin, scopolamin, and atropin will combine with camphoric acid in the molecular proportion of 1:1, even though added in excess of the molecular quantity. We have further found that it is immaterial whether the acid and the base are mixed in organic solvents such as ether, alcohol, and the like, or in watery solution in the form of salts.

Obviously the possibility of producing in this manner homogeneous well crystallized salts involves a substantial simplification, for instance in the case where solutions with an unknown content of the alkaloid are employed. The new compounds obtained are distinguished by their extraordinary therapeutical effect on the nervus vagus.

*Example 1.*—2 grams camphoric acid and 3 grams hyoscyamin are dissolved separately in absolute ether and the solutions are then mixed, whereupon the camphoric salt will be precipitated at once in microcrystals having a melting point of about 168° C.

*Example 2.*—6.4 grams scopolamin hydrate are dissolved in 100 grams ether and to the solution thus obtained is added a solution of 4 grams camphoric acid in 20 grams ether. The precipitated salt forms crystals having a melting point of about 145° C.

*Example 3.*—To a neutral solution of atropin hydrochloride is added camphoric sodium and the mixture is evaporated. The residue is dissolved in alcohol and forms the atropin mono-camphorate.

*Example 4.*—By precipitating a neutral solution of hyoscyamin sulfate with camphoric barium, separating the barium sulfate by filtration and evaporating, the camphoric hyoscyamin is obtained.

Various changes may be made in the details disclosed in the foregoing specification without departing from the invention or sacrificing the advantages thereof.

We claim:—

1. As a new product, a camphoric salt of an alkaloid which exerts a paralyzing effect on the nervus vagus, such salt being a combination of 1 mol. of the camphoric acid radical and 1 mol. of the alkaloid and forming crystals, such product exerting a vigorous therapeutical effect on the nervus vagus.

2. As a new product, camphoric scopolamin forming crystals melting at about 145°C. and having a vigorous therapeutical effect on the nervus vagus.

3. The method of producing salts of camphoric acid and alkaloids having a paralyzing effect on the nervus vagus, comprising acting with camphoric acid on a solution of an alkaloid of the kind described and causing crystallization of the compound formed in the solution.

4. The method of producing camphoric scopolamin comprising acting with solution of scopolamin on camphoric acid.

5. The method of producing camphoric scopolamin comprising acting with an etheric solution of 6,4 parts scopolamin hydrate on an etheric solution of 4 parts camphoric acid.

In testimony whereof we affix our signatures.

WALTER SCHOELLER.
HERBERT SCHOTTE.